United States Patent Office 3,310,575
Patented Mar. 21, 1967

3,310,575
METAL DERIVATIVES OF DIALKYLHYDROXY-PHENYLALKYLPHOSPHONIC ACIDS AND PHOSPHONIC ACID HALF-ESTERS
John D. Spivack, Spring Valley, N.Y., assignor to Geigy Chemical Corporation, Greenburgh, N.Y., a corporation of Delaware
No Drawing. Filed Nov. 26, 1965, Ser. No. 510,065
26 Claims. (Cl. 260—429)

This is a continuation-in-part of Ser. No. 425,332, filed Jan. 13, 1965, now abandoned, which, in turn, is a continuation-in-part of Ser. No. 187,207, filed Apr. 13, 1962, now abandoned, which, in turn, is a continuation-in-part of Ser. No. 102,958, filed Apr. 14, 1961, now abandoned.

The present invention relates to novel metal derivatives of certain phosphonic acids and phosphonic acid half-esters, to methods for the preparation of such derivatives and to novel applications and compositions utilizing these derivatives.

While the inherent physical properties of synthetic polymeric substances, such as poly-α-olefins of the poly-ethylene and polypropylene type, make possible a wide range of applications, they also present a number of problems in processing and use, such as heat instability, fading upon exposure to light, and resistance to dyeing. In the above-recited Ser. No. 187,207, there are disclosed certain phosphonic acids and phosphonic acid half-esters which increase the stability of synthetic polymeric substances to thermal oxidative degradation. The present invention is based on the discovery that the metal salts of these phosphonic acids and phosphonic acid half-esters not only share these thermal stabilizing properties, but further exhibit properties not shared by the free acids or half-esters of (a) rendering the polymeric substance more amenable to dyeing and (b) reducing the tendency of the polymeric substance to discolor upon exposure to light, whether dyed or not.

The compounds contemplated by the present invention are metal derivatives of monobasic and dibasic hindered phenol substituted phosphonic acids. More particularly, this invention comprehends compounds of the formula:

$$[P]_m M_x [G]_p$$

wherein

M is a metal having an available valence of from 1 to 4;
G is an anion having an available valence of from 1 to 3; and
P is of the formula:

$$\left[ \text{HO}-\underset{H-(C_zH_{2z})}{\bigcirc}-(C_yH_{2y})-\overset{O}{\underset{O-(alkyl)_n}{P}}-O- \right]$$
(lower) alkyl and wherein
$z$ has a value of from 0 to 6,
$y$ has a value of from 1 to 4,
$n$ has a value of from 0 to 1,
$m$ has a value of from 1 to 3,
$x$ has a value of from 1 to 2, and
$p$ has a value of from 0 to 3, $n$, $m$, $p$ and $x$ being so selected as to satisfy the expression $$\frac{(2-n)m}{x} + \frac{(r)p}{x} = \text{available valence of } M$$

wherein $r$ is the valence of anion G and has a value of from 1 to 3.

The group M consists either of a metal in full free valence state such as sodium, cadmium, zinc, barium, nickel, aluminum, tin, chromium, cobalt, iron, copper, titanium, vanadium, and the like, or of a metal derivative in which part but not all of its full free valence state is satisfied by alkyl substitution, e.g. dialkyltin. Preferably M is a metal in its full free valence state, particularly those having a valence of 2 to 4 such as cadmium, zinc, barium, nickel, iron, copper, aluminum, tin, chromium, titanium, vanadium, and cobalt. Of these, aluminum and the transitional metals, particularly nickel, are especially useful.

The available valence bonds of the metal will be satisfied by one or more phosphonate or O-alkyl phosphonate groups and, if needed, by anions, organic or inorganic. Thus when $n=0$, there may be one ($m=1$) or more ($m=2$ or 3) phosphonate groups. Likewise there may be one or more O-alkyl phosphonate groups ($n=1$). In some instances, as in the case of aluminum or chromium, three phosphonate groups combined with two metal atoms ($x=2$) to satisfy the valence requirements. In the case of mixed salts, one, two or three monovalent anions will make up the valence requirements. In all instances, the compounds will contain at least one phosphonate group or at least one O-alkyl phosphonate group and the values of $n$, $m$, $p$ and $x$ is such that the following expression is satisfied:

$$\frac{(2-n)m}{x} + \frac{(r)p}{x} = \text{available valance of } M$$

wherein $r$ is the valence of anion G and has a value of from 1 to 3.

The anion G may be organic or inorganic. Illustrative of such organic anions are carboxylate, such as those derived from carboxylic acids containing from 1 to 30 carbon atoms, preferably 2 to 18 carbon atoms, e.g. acetate, laurate, stearate, benzoate, malonate, maleate, succinate, and the like; phenates and alkyl substituted phenates; alkyl- and aryl-sulfates and -sulfonates; alkyl- and arylphosphates and -phosphonates; and inorganic anions such as chloride, bromide, iodide, fluoride, nitrate, cyanide, cyanate, thiocyanate, sulfate, and the like.

As the embodiments of this invention, mention is made of compounds of the formulae:

$$\left[ \text{HO}-\underset{H-(C_zH_{2z})}{\bigcirc}-(CH_2)-\overset{O}{\underset{O-(alkyl)_n}{P}}-O- \right]_m M_x$$
(lower) alkyl
(Ia)

wherein M, $z$, $y$, $n$, $m$ and $x$ have the values defined above;

$$\left[ \text{HO}-\underset{\text{(lower) alkyl}}{\overset{\text{(lower) alkyl}}{\bigcirc}}-(C_yH_{2y})-\overset{O}{\underset{O(alkyl)_n}{P}}-O- \right]_m M_x$$
(Ib)

wherein M, $y$, $n$, $m$ and $x$ have the values defined above; and $$\left[ \text{HO}-\underset{(CH_3)_3C}{\overset{(CH_3)_3C}{\bigcirc}}-CH_2-\overset{O}{\underset{O-(alkyl)_n}{P}}-O- \right]_m M_x$$
(Ic)

wherein M is a metal having an available valence of from 2 to 3 and is selected from cadmium, zinc, barium, nickel, aluminum, tin, chromium or cobalt; and $n$, $m$ and $x$ have the values defined above.

By the term "alkyl" when used in this specification and the appended claims, is intended a branched or straight-chained saturated hydrocarbon group having from 1 to about 30 carbon atoms. When qualified by the term "(lower)," the hydrocarbon chain will contain from 1 to about 6 carbon atoms. Typical of such alkyl groups are thus methyl, ethyl, propyl, isopropyl, butyl, t-butyl, pentyl, isopentyl, hexyl, octyl, t-octyl, decyl, tetradecyl, hexadecyl, octadecyl, eicosyl, docosyl, triacontyl and the like.

The phenyl group of phosphonate moiety is substituted by a hydroxy group and one ($z=0$) or two ($z=1$ to 6) (lower) alkyl groups. These substituents may be located on the phenyl group in a number of ways. From the standpoint of maximizing the antioxidant properties, it is generally desirable to utilize a 3,5-dialkyl-4-hydroxyphenyl arrangement, e.g., 3,5-di-t-butyl-4-hydroxybenzylphosphonate. However, other arrangements such as 2-hydroxy-5-(lower)alkylphenyl are also within the scope of the present invention.

The following formulae, in which R represents the group:

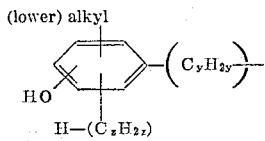

are typical structures of the compounds of this invention without being a limitation thereof:

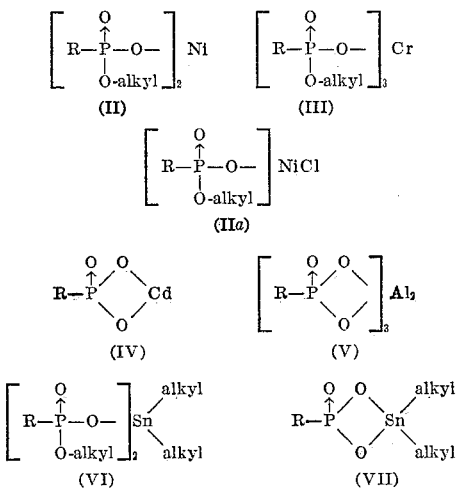

The compounds of this invention may be incorporated in the polymeric substance during the usual processing operations. Thus, for example, they may be introduced into polypropylene by hot milling, the polymers then being extruded, pressed, blow molded or the like into films, fibers, filaments, hollow shapes and the like. The heat stabilizing properties of the free phosphonic acids and their half-esters are also exhibited by the metal derivative of this invention, in some cases to even a greater extent, and accordingly the polymer is advantageously stabilized against degradation at the high temperatures encountered during such processing. Unlike polymer compositions containing the free acid or half-ester stabilizers, however, compositons containing these novel salts may be dyed, either directly after incorporation of the salt or after further processing, such as the formation of yarns or fabrics. The polymer is stabilized by the presence of these metal salts both before and after dyeing so that the coloring step need not follow directly. Furthermore, additional antioxidants which are normally added are not required. Once dyed, the colored compositions thus exhibit both thermal stability and fastness to light and to solvents, such as encountered in washng or dry cleaning, and can be dyed in a manner impossible to achieve with many polymers.

The conditions of the dyeing will of course vary with the particular dye employed. Generally the nature of the dye is not restricted and any of the many known metal chelating dyes may be employed. It is also to be understood that the effect obtained with a particular dye may be altered by variation of the particular metal cation of these compounds and by the amount of these compounds present in the polymer. Generally from about 0.05 to 10%, preferably 0.1 to 5% by weight is employed, but this is not critical.

While polypropylene has been herein mentioned specifically, it is apparent that these compounds are useful in numerous other substances whose regular and inert polymeric structures tend to resist dyes. Materials for which the compounds of the present invention are useful thus include synthetic organic polymeric substances, both homopolymeric and copolymeric, such as vinyl resins formed from the polymerization of vinyl halides or from the copolymerization of vinyl halides with unsaturated polymerizable compounds, e.g., vinyl esters, $\alpha,\beta$-unsaturated, $\alpha,\beta$-unsaturated esters, $\alpha,\beta$-unsaturated ketones, $\alpha,\beta$-unsaturated aldehydes and unsaturated hydrocarbons such as butadienes and styrene; poly-$\alpha$-olefins such as polymethylene, polyethylene, polypropylene, polybutylene, polyisoprene and the like, including copolymers of poly-$\alpha$-olefins; polyurethanes such as are prepared from polyols and organic polyisocyanates; polyamides, such as polyhexamethylene adipamide; polyesters such as polymethylene terephthalates; polycarbonates; polyacetals; polystyrene; polyethyleneoxide; polyacrylics such as polyacrylonitrile; and the like, including mixtures of the foregoing such as those of high impact polystyrene containing copolymers of butadiene and styrene and those formed by the copolymerization of acrylonitrile, butadiene and/or styrene. The compounds of this invention may be used for stabilizing the above materials even when dyeing is not anticipated.

Other materials which, while not generally dyed, are nevertheless stabilized by the compounds of the present invention include lubricating oil of the aliphatic ester type, e.g. di-(2-ethylhexyl)azelate, pentaerythitol tetracaproate and the like; animal and vegetable derived oils, e.g., linseed oil, fat, tallow lard, peanut oil, cod liver oil, castor oil, palm oil, cotton seed oil and the like; hydrocarbon material such as gasoline, both natural and synthetic, diesel oil, mineral oil, fuel oil, cutting fluids, waxes, resins and the like; fatty acids; varnishes, soaps; and the like.

The compounds of the present invention are prepared by treating a phosphonic acid or half ester of the formula:

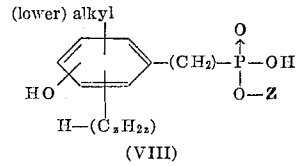

wherein Z is hydrogen or alkyl, with the appropriate metal halide, such as the metal chloride. Preferably an alkali metal salt of (VIII), such as the sodium or potassium salt, is employed. Generally the product is formed spontaneously or after a short reaction period and need only be freed of by-products, solvents, and unreacted starting material, if any, as by washing and extraction.

The mixed salts of this invention can be prepared by reaction of an appropriate phosphonic acid or half ester of Formula VIII above with more than the stoichiometrically equivalent amount of the appropriate metal derivative such as a metal halide, carboxylate, phenate, alkyl sulfate, alkyl phosphate, nitrate, cyanide, cyanate, thiocyanate, sulfate, and the like. However it is especially convenient to use a double decomposition reaction between an easily prepared salt of the compounds of Formula VIII, such as the sodium salt and the appropriate metal derivative. Thus nickel -(O - n-butyl-3,5-di-t-butyl-4-hydroxybenzylphosphonate)-chloride is prepared by treating sodium O-butyl-3,4-di-t-butyl-4-hydroxybenzyl phosphonate with nickel chloride.

The free phosphonic acids and half esters may be prepared according to the procedures described in Ser. No. 187,207, or procedures more fully described hereafter.

The following examples will serve to further typify the nature of this invention. These examples are presented solely for purpose of illustration and not as a limitation on the scope of this invention, the invention being defined by the specification and claims, which are addressed to those skilled in this art.

EXAMPLE 1

Sodium (O-butyl 3,5-di-t-butyl-4-hydroxybenzyl-phosphonate)

(a) *2,6-di-t-butyl-4-chloromethylphenol.*—Gaseous hydrogen chloride is bubbled through a dispersion of 19.5 g. of paraformaldehyde (0.65 m.) in 1000 ml. of glacial acetic acid at 15–20° C. A clear solution results after 20 minutes and 103 g. (0.5 m.) of 2,6-di-t-butylphenol dissolved in 50 ml. of glacial acetic acid are then added over a period of 5 minutes at 17–30° C., the introduction of hydrogen chloride being continued. After addition is complete, the reaction mixture is stirred at 25–27° for 45 minutes. The introduction of hydrogen chloride is then stopped and the reaction mixture is separated, the aqueous phase being saved. The non-aqueous layer is dissolved in 150 ml. of benzene and washed successively with saturated sodium chloride solution, saturated sodium bicarbonate solution and 9% sodium bisulfite solution. The benzene layer is next dried over anhydrous magnesium sulfate, filtered and evaporated in vacuo. The residue consisting essentially of 2,6-di-t-butyl-4-chloromethylphenol is distilled at 118–121°/0.8–0.9 mm.

In a similar fashion, by substituting 2-methyl-6-t-butylphenol and 2,4-di-t-butylphenol for 2,6-di-t-butylphenol, there are respectively obtained 2-methyl-4-chloromethyl-6-t-butylphenol and 2,4-di-t-butyl-6-chloromethylphenol, M.P. 62–64° C.

(b) *Di-(n-butyl) 3,5-di-t-butyl-4-hydroxybenzylphosphonate.*—Twenty-five grams of tri-(n-butyl) phosphite and 25.7 g. of 2,6-di-t-butyl-4-chloromethylphenol are combined at room temperature under nitrogen in a reaction vessel fitted for distillation. The reaction is exothermic and butyl chloride distills at about 75° C. The mixture is heated at atmospheric pressure to complete the distillation of butyl chloride and then distilled in vacuo to yield the product di-(n-butyl) 3,5-di-t-butyl-4-hydroxybenzylphosphonate B.P. 177–187° C./0.10–0.20 mm. Upon redistillation at 182–185.5° C./0.15–0.20 mm., the product solidifies, M.P. 45–48° C.

By utilizing trimethylphosphite, tri-(n-hexadecyl)phosphite, tri-(n-octadecyl)phosphite and tridocosylphosphite in place of tri-(n-butyl)phosphite, there are respectively obtained, dimethyl 3,5-di-t-butyl-4-hydroxybenzylphosphonate, M.P. 156–158° C.; di-n-hexadecyl 3,5-di-t-butyl-4-hydroxybenzylphosphonate, M.P. 44–46.5° C.; di-n-octadecyl 3,5-di-t-butyl-4-hydroxybenzylphosphonate, M.P. 55–57° C. and didocosyl 3,5-di-t-butyl-4-hydroxybenzyl-phosphonate, M.P. 45–48° C.

Likewise by reacting tri-(n-octadecyl)phosphite with 2-methyl-4-chloromethyl-6-t-butylphenol and with 2,4-di-t-butyl-6-chloromethylphenol in the manner of this example, there are respectively obtained di-n-octadecyl 3-methyl-4-hydroxy-5-t-butylbenzylphosphonate, M.P. 69–71° C. and di-n-octadecyl 2-hydroxy-3,5-di-t-butylbenzylphosphonate, M.P. 51° C.

(c) *Sodium (O-butyl 3,5-di-t-butyl-4-hydroxybenzyl-phosphonate).*—To a solution of 206 g. of dibutyl 3,5-di-t-butyl-4-hydroxybenzylphosphonate in 250 ml. of methanol is added under nitrogen, a solution of 268 g. of a 50% aqueous sodium hydroxide solution in 250 ml. of methanol. The reaction mixture is refluxed 24 hours, after which time an aliquot is taken, dissolved in isopropanol and titrated with 0.1 N methanolic hydrochloric acid. The titration shows two endpoints and after calculating the amount of sodium hydroxide in the mixture, an equivalent amount of concentrated hydrochloric acid is added slowly with cooling. The precipitated sodium chloride is removed by filtration and washed with isopropanol. The washings and filtrate are combined and evaporated in vacuo to dryness. The residue is triturated with hot isopropanol, cooled and filtered. The residue is washed with hot isopropanol and the combined washings and filtrate are again evaporated to dryness. This product is dissolved in hot heptane which precipitates the sodium salt of O-butyl 3,5-di-t-butyl-4-hydroxybenzylphosphonic acid as a white solid.

In a similar fashion, di-(n-octadecyl) 3,5-di-t-butyl-4-hydroxybenzylphosphonate and similar dialkyl dialkylhydroxybenzylphosphonates are partially saponified with sodium hydroxide to yield sodium (O-octadecyl 3,5-di-t-butyl-4-hydroxybenzylphosphonate) and the like sodium salts of the other half-esters.

Other half-esters may be prepared in the following manner. A solution of 7.7 g. of 3,5-di-t-butyl-4-hydroxybenzylphosphonic acid in 50 ml. of xylene is introduced into a 3-neck flask equipped with a nitrogen inlet tube, stirrer, Dean-Stark water trap and condenser. There are then added 13.62 g. of octadecanol and 0.1 g. of p-toluenesulfonic acid and the reactants are heated under reflux for 28 hours while 0.65 ml. of water are collected. The reaction mixture is then diluted with 50 ml. of diethyl ether, washed with water to remove the p-toluenesulfonic acid and finally dried over anhydrous sodium sulfate. The solvent is distilled under vacuum and the resulting residue is topped in a molecular still at 220°/1–5 microns. The viscous residue becomes solid on trituration with acetonitrile and the produce O-octadecyl-3-t-butyl-4-hydroxybenzylphosphonic acid is obtained by successive recrystallization from petroleum ether and hexane as a white crystalline compound, M.P. 98–100°.

This product is then treated with sodium hydroxide in ethanol to yield the corresponding sodium salt.

EXAMPLE 2

Sodium [O-dodecyl β-(3,5-di-t-butyl-4-hydroxyphenyl) ethylphosphonate]

(a) *2,6-di-t-butyl - 4-(β-hydroxyethyl)phenol.*—A dispersion of 11 g. of lithium aluminum hydride in 900 ml. of anhydrous ether is heated to reflux temperature and 97 g. of methyl 3,5-di-t-butyl-4-hydroxyphenylacetate in 300 ml. of anhydrous ether is added in a dropwise fashion at such a rate as to maintain a gentle reflux. The mixture is then refluxed for four hours, cooled to room temperature and cautiously treated successively with 100 ml. of ethyl acetate, 200 ml. of water, and 400 ml. of 10% aqueous sulfuric acid. The organic layer is separated, washed with 200 ml. of 1 N sodium hydroxide followed by water, dried and evaporated. The solid thus formed is dissolved in 170 ml. of ethanol containing 9.8 g. of potassium hydroxide and this solution is then heated at reflux for 45 minutes. After cooling, it is next poured into 500 ml. of water and filtered. The solid thus formed is washed with water, dried in vacuo at 60° C. and recrystallized from carbon tetrachloride:petroleum ether to yield the desired intermediate, M.P. 99–101° C.

In a similar fashion higher phenolic alkanoates such as methyl β-(3,5-di-t-butyl-4-hydroxyphenyl) propionate are reduced to yield the corresponding alcohols such as 2,6-di-t-butyl-4-(γ-hydroxypropyl)phenol.

(b) *2,6-di-t-butyl-4-(β-chloroethyl)phenol.*—To a solution of 57 g. of 2,6-di-t-butyl-4-(β-hydroxyethyl)phenol and 1 g. of pyridine in 250 ml. of dry benzene are added in a dropwise fashion at 35° C. and over a period of 10 minutes, 47.5 g. of thionyl chloride. The mixture is refluxed for three hours and the liquid phase is then decanted and washed successively with a saturated aqueous sodium chloride solution, a saturated sodium bicarbonate solution, and again with the sodium chloride solution.

After drying over magnesium sulfate, the benzene solution is evaporated in vacuo and the residue then distilled at 130–147° C./3 mm. and redistilled at 120° C./0.3 mm. to yield 2,6-di-t-butyl-4-(β-chloroethyl)phenol, M.P. 66–67° C.

Likewise this procedure may be employed to prepare other dialkyl chloroalkylphenols such as 2,6-di-t-butyl-4-(γ-chloropropyl)phenol.

(c) *Di - (n - dodecyl) β - (3,5 - di - t - butyl - 4 - hydroxyphenyl) ethylphosphonate.*—Tri - (n-dodecyl)phosphite (17.5 g.) and 8.1 g. of 2,6-di-t-butyl-4-(β-chloroethyl) phenol are melted together under nitrogen at 70–80° C. and then are heated at 120–150° C./0.2–0.4 mm. for two hours; 170° C./20 mm. for 30 minutes; 200° C./20 mm. for 30 minutes; 230° C./20 mm. for 30 minutes and 260° C./50 mm. for 2 hours. The mixture is then distilled at 175° C./35 mm. to remove dodecyl chloride and the residue then chromatographed on a silica gel column to yield di-(n-dodecyl) β-(3,5-di-t-butyl-4-hydroxyphenyl) ethylphosphonate as a straw colored viscous oil.

Likewise by use of tri-hexadecylphosphite and 2,6-di-t-butyl-4-(γ-chloropropyl)phenol in the procedure of this example, there is obtained dihexadecyl γ-(3,5-di-t-butyl-4-hydroxyphenyl)propylphosphonate. Similarly by use of 2,6-di-t-butyl-4-(α-chloroethyl)phenol and trioctadecylphosphite, there is obtained dioctadecyl α-(3,5-di-t-butyl-4-hydroxyphenyl)ethylphosphonate, M.P. 72–74° C.

(d) *Sodium [O-dodecyl β-(3,5-di-t-butyl-4-hydroxyphenyl)]ethylphosphonate.*—By subjecting didodecyl β-(3,5-di-t-butyl-4-hydroxyphenyl)ethylphosphonate to the procedure of Example 1, part (c), there is obtained the mono sodium salt of O-dodecyl β-(3,5-di-t-butyl-4-hydroxyphenyl)ethylphosphonic acid.

In a similar fashion, dihexadecyl γ-(3,5-di-t-butyl-4-hydroxyphenyl)propylphosphonate and dioctadecyl α-(3,5-di-t-butyl-4-hydroxyphenyl)-ethylphosphonate are converted to the sodium salts of O-hexadecyl γ-(3,5-di-t-butyl-4-hydroxyphenyl)propylphosphonic acid and O-octadecyl α - (3,5 - di - t - butyl - 4 - hydroxyphenyl)-ethylphosphonic acid.

EXAMPLE 3

*3,5-di-t-butyl-4-hydroxybenzylphosphonic acid*

To a solution of 157 g. of potassium hydroxide in 600 ml. of isopropanol are added 164 g. of diphenyl 3,5-di-t-butyl-4-hydroxybenzylphosphonate. The solution is heated at reflux for 44 hours, cooled to 20° C. with ice-water and rendered acidic to pH 2 by addition of concentrated hydrochloric acid diluted with an equal amount of water. An additional 500 ml. of water are added and the mixture then transferred to a separatory funnel and the semi-solid organic layer washed with water and benzene, and then filtered. The solid thus collected is washed with cold water and dried. The dried solid is then triturated twice with hot heptane, dried and recrystallized from acetonitrile to yield 3,5-di-t-butyl-4-hydroxybenzylphosphonic acid, M.P. 205° C. (dec.).

EXAMPLE 4

*Nickel bis(O-butyl 3,5-di-t-butyl-4-hydroxybenzylphosphonate)*

A solution of 11.35 g. (0.03 m.) of sodium (O-butyl 3,5-di-t-butyl-4-hydroxybenzylphosphonate) in 70 ml. of isopropanol is added to a solution of 3.56 g. (0.015 m.) of nickel chloride hexahydrate in 20 ml. of methanol subsequently diluted with 40 ml. of isopropanol. The reaction mixture is kept at a temperature of 45–50° C. for one hour and then centrifuged. The clear green solution thus obtained is concentrated under vacuum and the residue dissolved in heptane. The solution is then filtered and evaporated to yield the product, M.P. 120–130° C.

Calc.: P, 8.05; N, 7.64. Found: P, 8.02; N, 7.63.

Likewise by substituting sodium (O-octadecyl 3-methyl-4-hydroxy-5-t-butylbenzylphosphonate) and sodium (O-octadecyl 2-hydroxy-3,5-di-t-butylbenzylphosphonate) in this procedure, there are respectively obtained, nickel bis(O - octadecyl 3 - methyl - 4 - hydroxy - 5 - t - butylbenzylphosphonate) and nickel bis (O-octadecyl 2-hydroxy-3,5-di-t-butylbenzylphosphonate).

Similarly by substituting an equivalent amount of cupric chloride for nickel chloride, and the sodium [O-hexadecyl γ - (3,5 - di - t - butyl - 4 - hydroxyphenyl) propylphosphonate] for sodium (O-butyl 3,5-di-t-butyl-4-hydroxybenzylphosphonate) in the procedure of this example, there is obtained cupric bis[O-hexadecyl γ-(3,5-di-t-butyl-4-hydroxyphenyl)propylphosphonate].

EXAMPLE 5

*Aluminum tris(O-butyl-3,5-di-t-butyl-4-hydroxybenzylphosphonate)*

A solution of 10.5 g. (0.27 m.) of sodium (O-butyl-3,5-di-t-butyl-4-hydroxybenzylphosphonate) in 50 ml. of methanol is added to a solution of 2.17 g. (0.009 m.) of aluminum chloride hexahydrate in 200 ml. of warm methanol. The reaction mixture is heated at 45–50° C. under reduced pressure, permitting the methanol to distill, until the solution becomes turbid. Distillation is then stopped and heating is continued for one hour. The remaining solvent is then removed in vacuo and the residue taken up in benzene and centrifuged. The clear yellowish supernatant liquid is then concentrated in vacuo to yield the product as a glass. This product demonstrates shrinking and partial decomposition at 130–140° C., a clear melt at 180° and decomposition at 300° C.

Calc.: P, 8.50; Al, 2.46. Found: P, 8.34; Al, 2.23.

In a similar fashion, ferric chloride is substituted for aluminum chloride and sodium [O-octadecyl α-(3,5-di-t-butyl-4-hydroxyphenyl)ethylphosphonate] for sodium O-butyl 3,5-di-t-butyl-4-hydroxybenzylphosphonate) in the procedure of the foregoing example to yield ferric tris[O-octadecyl α-(3,5-di-t-butyl-4-hydroxyphenyl)ethylphosphonate].

EXAMPLE 6

*Chromium tris(O-butyl 3,5-di-t-butyl-4-hydroxybenzylphosphonate)*

Solutions of 2.66 g. (0.01 m.) of chromium chloride hexahydrate in 80 ml. of isopropanol and 11.3 g. (0.03 m.) of sodium (O-butyl 3,5-di-t-butyl-4-hydroxybenzylphosphonate) in 80 ml. of isopropanol are allowed to react in the manner of Example 4. After centrifugation, the solid obtained upon concentration of the supernatant is dissolved in benzene and the benzene solution washed with water and evaporated in vacuo to yield the desired product, M.P. 120–130° C. (dec.).

Calc.: P, 8.30; Co, 4.66. Found: P, 8.08; Co, 4.70.

EXAMPLE 7

*Cobalt bis(O-butyl 3,5-di-t-butyl-4-hydroxybenzylphosphonate)*

Solutions of 2.38 g. (0.01 m.) of cobalt chloride hexahydrate in 100 ml. of isopropanol and 7.6 g. (0.02 g.) of sodium (O-butyl 3,5-di-t-butyl-4-hydroxybenzylphosphonate) in 60 ml. of warm isopropanol are allowed to react in the manner of Example 4. The solid which forms is collected by filtration, washed with isopropanol, dried in vacuo at 40° C. and then dissolved in about 140 ml. of hot methanol. The cooled alcoholic solution is then added with rapid agitation to approximately 600 ml. of cold water. The solid which forms is collected by filtration and dried to yield the product, M.P. 295–300° C. (dec.).

Calc.: P, 8.05; Co, 7.67. Found: P, 7.75; Co, 6.86.

EXAMPLE 8

*Stannous bis(O-butyl 3,5-di-t-butyl-4-hydroxybenzylphosphonate)*

A hot (60° C.) solution of 19.0 g. (0.05 m.) of sodium (O-butyl 3,5-di-t-butyl-4-hydroxybenzylphosphonate) in 75 ml. of dioxane is added to a solution of 5.75 g. (0.025 m.) of stannous chloride dihydrate in 50 ml. of dioxane and the resultant reaction mixture then heated at 45–50° C. for one hour. The mixture is then centrifuged and the turbid supernatant filtered through Filtercel and concentrated in vacuo. The residue is dissolved in heptane and the solution then filtered through Filtercel and evaporated to yield the product, M.P. 95–100° C., (dec.) 130° C.

Calc.: P, 7.46; Sn, 14.32. Found: P, 6.00; Sn, 14.47.

EXAMPLE 9

*Cadmium bis(O-butyl 3,5-di-t-butyl-4-hydroxybenzylphosphonate)*

To a solution of 11.55 g. (0.03 m.) of sodium (O-butyl 3,5-di-t-butyl-4-hydroxybenzylphosphonate) in 100 ml. of water is added a solution of 2.75 g. (0.015 m.) of anhydrous cadmium chloride in 50 ml. of water. The resultant thick slurry is stirred at 40 to 45° C. for one hour and then filtered under suction. The solid thus collected is throughly washed with water and dried at 40° C. under vacuum. The dried solid is then triturated with hot hexane, filtered and dried under vacuum. The dried solid is next dissolved in ethanol and the solution's slight turbidity removed by filtration. Thirty-five milliliters of water are then added to the filtrate, which is allowed to stand with cooling until crystallization occurs, seeding if necessary. The solid thus formed is collected and again recrystallized from ethanol with addition of water to yield the product as an off-white crystal, M.P. 250–255° C.

Calc.: P, 7.52; Cd, 13.69. Found: P, 7.09; Cd, 13.63.

EXAMPLE 10

*Barium bis(O-butyl 3,5-di-t-butyl-4-hydroxybenzylphosphonate)*

A solution of 19.00 g. (0.05 m.) of sodium (O-butyl 3,5-di-t-butyl-4-hydroxybenzylphosphonate) in 75 ml. of water and a solution of 6.12 g. (0.025 m.) of barium chloride dihydrate in 50 ml. of water are mixed and allowed to stand for one hour. At the end of this time the aqueous phase is decanted and the residual solid taken up in ether. The ethereal solution is washed with water, filtered and evaporated. The solid thus obtained is ground to a powder and titurated with ethanol. This slurry is then cooled and filtered and the solid washed with hexane and dried. This solid is then recrystallized from hot methanol with the addition of water to effect precipitation. After cooling, the solid is collected by filtration and dried to yield the product, M.P. 240–247° C. (dec.).

Calc.: P, 7.30; Ba, 16.20. Found: P, 6.30; Ba, 17.07.

EXAMPLE 11

*Zinc bis(O-butyl 3,5-di-t-butyl-4-hydroxybenzylphosphonate)*

A solution of 2.85 g. of zinc chloride in 50 ml. of isopropanol is added to a solution of 15.24 g. of sodium (O-butyl 3,5-di-t-butyl-4-hydroxybenzylphosphonate) in 40 ml. of isopropanol and the resultant mixture is collected by filtration, washed with a little isopropanol, dried, and dispersed in about 150 ml. of water. The solid is collected and dispersed in fresh portion of 150 ml. of water. The solid is collected by filtration, washed with distilled water and dried in a vacuum oven at 40° C. to yield the desired product, M.P. 295–300° C.

Calc.: P, 7.98; Zn, 8.42. Found: P, 7.68; Zn, 8.31.

EXAMPLE 12

*Dibutyltin bis(O-butyl 3,5-di-t-butyl-4-hydroxybenzylphosphonate)*

To a solution of 15.1 g. of sodium (O-butyl 3,5-di-t-butyl-4-hydroxybenzylphosphonate) in 100 ml. of benzene are added 3.28 ml. of 37.5% hydrochloric acid. The mixture is stirred for 30 minutes and then refluxed until the sodium chloride formed is a fine precipitate. The water formed is removed as the azeotrope. The solid is then removed by filtration and washed with benzene. To the filtrate and washings are added 4.97 g. of dibutyltin oxide and the slurry is then refluxed for 3 hours. When the theoretical amount of water (0.36 ml.) is obtained as the azeotrope, the reaction mixture is filtered through Filtercel and the filtrate evaporated to dryness. The solid is then recrystallized from cyclohexane to yield the product, M.P. 201–207° C.

Calc.: P, 6.57; Sn, 12.6. Found: P, 7.00; Sn, 12.1.

EXAMPLE 13

*Barium 3,5-di-t-butyl-4-hydroxybenzylphosphonate*

To a solution of 3,5-di-t-butyl-4-hydroxybenzylphosphonic acid in 50 ml. of distilled water are added 26.35 ml. of 1.518 N isopropanolic potassium hydroxide. This mixture is then added to 4.88 g. of barium chloride dihydrate in 50 ml. of distilled water. After stirring for one hour at 45–50° C., the mixture is filtered and the solid thus collected washed with water and dispersed in water. The solid is collected by filtration, dried in vacuo at 40° C. and recrystallized from ethanol with the addition of water. The product thus obtained melts above 300° C.

Calc.: P, 7.11; Ba, 31.55. Found: P, 7.26; Ba, 31.50.

EXAMPLE 14

*Dialuminum tris(3,5-di-t-butyl-4-hydroxybenzylphosphonate)*

To a solution of 7.04 g. of 3,5-di-t-butyl-4-hydroxybenzylphosphonic acid in 20 ml. of isopropanol are added under nitrogen and with stirring, 29.65 ml. of 1.518 N isopropanolic potassium hydroxide. This mixture is then added to a dispersion of 2.62 g. of aluminum chloride hexahydrate in 200 ml. of methanol. The mixture is kept at 40–45° C. for one hour with a slight vacuum for removal of the methanol. Distillation is then stopped and the reaction mixture heated at 45–50° C. for thirty minutes. After removing the insoluble material by filtration, the filtrate is concentrated in vacuo and the solid dissolved in heptane, filtered through Filtercel and concentrated. The product after recrystallization from heptane melts above 300° C.

Calc.: P, 9.81; Al, 5.68. Found: P, 9.18; Al, 5.10.

EXAMPLE 15

*Cadmium 3,5-di-t-butyl-4-hydroxybenzylphosphate*

A solution of 9.36 of 3,5-di-t-butyl-4-hydroxybenzylphosphonic acid in 20 ml. of isopropanol is treated with 39.6 ml. of 1.518 N isopropanolic potassium hydroxide and the resulting solution used to treat 5.49 g. of anhydrous cadmium chloride in 50 ml. of water in the manner of Example 13 to yield the product of this example as an off-white solid.

Calc.: P, 7.54; cd, 27.45. Found: P, 7.53; cd, 27.44.

EXAMPLE 16

*Nickel 5,5-di-t-butyl-4-hydroxybenzylphosphonate*

To a dispersion of 6.25 g. of 3,5-di-t-butyl-4-hydroxybenzylphosphonic acid in 30 ml. of isopropanol are added under nitrogen and with stirring 26.35 ml. of 1.518 N isopropanolic potassium hydroxide. This solution is then added to 4.74 g. of nickel chloride hexahydrate in 20 ml. of methanol. The reactants are heated at 45–50° C. for 1½ hours and then centrifuged. The supernatant liquid is concentrated in vacuo and the residue dissolved in benzene and filtered through Filtercel. Concentration of the benzene solution and tituration of the residue with heptane yields the product as a solid melting above 300° C.

Calc.: P, 8.68; N, 16.42. Found P, 8.59; N, 15.05.

EXAMPLE 17

*Zinc 3,5-di-t-butyl-4-hydroxybenzylphosphonate*

3,5 - di -t-butyl-4-hydroxybenzylphosphonic acid (9.36 g.) in 50 ml. of isopropanol is treated with 39.6 ml. of isopropanolic potassium hydroxide and this solution is then used to treat 4.27 g. of 96.5% zinc chloride in 50 ml. of isopropanol in the manner of Example 16. Upon isolation substantially as therein described, there is obtained the product of this example with a melting point above 300° C.

Calc.: P, 8.52; Zn, 15.49. Found: P, 7.66; Zn, 14.87.

EXAMPLE 18

*Nickel bis(O-octadecyl 3,5-di-t-butyl-4-hydroxy benzyl phosphonate)*

(a) *O - octadecyl - 3,5,di-t-butyl-4-hydroxybenzylphosphonic acid.*—To a stirred dispersion of 1006 g. of di-n-octadecyl 3,5 - di - t - butyl-4-hydroxybenzylphosphonate (90% purity) in 2600 ml. of ethanol are rapidly added under nitrogen, 580 g. of 51.9% aqueous sodium hydroxide. The mixture is stirred at 65° C. for 48 hours, cooled and poured into 2 liters of 4.5 N hydrochloric acid. The organic layer is extracted with 800 ml. of heptane and these extracts in turn washed with 500 ml. of water at about 40° C. and concentrated at 50°/20 mm. and then 50°/1 mm. The residual product is topped in a falling film molecular still at 170–200°/1 micron and can be used in the following procedure without further purification.

(b) *Nickel bis(octadecyl 3,5 - di - t - butyl-4-hydroxybenzylphosphonate).*—A solution of 110.5 g. of the product of part (a) of this example in 400 ml. of isopropanol neutralized exactly with 0.973 N methanolic sodium hydroxide. The reaction mixture is then concentrated in vacuo at 60° C. Seventy-two grams of the residue in 250 ml. of hot methanol are treated with 29.1 g. of nickel chloride (as little as 14.6 g. may be used) in 50 ml. of methanol with stirring. The solvent is then removed in vacuo and the residue dissolved in 400 ml. of hexane and washed three times with water to remove unreacted nickel chloride. The hexane solution is dried overnight over sodium sulfate and then thoroughly evaporated to yield nickel bis(O-octadecyl 3,5-di-t-butyl-4-hydroxybenzylphosphonate).

Calc.: P, 5.33; Ni, 5.04. Found: P, 5.34; Ni, 4.88.

EXAMPLE 19

*Dibutyltin (3,5-di-t-butyl-4-hydroxybenzylphosphonate)*

A solution of 6.25 g. of 3,5-di-t-butyl-4-hydroxybenzylphosphonic acid in 100 ml. of benzene is azeotropically distilled to remove any traces of water. There are then added 4.97 g. of dibutyltinoxide and the turbid mixture is refluxed for 5 hours. The hot reaction mixture is filtered and the filtrate concentrated in vacuo. The residue is dissolved in hot heptane and this solution is then filtered hot and allowed to cool. The solid which forms is collected by filtration, washed with a small amount of cold heptane, and dried to yield the desired product as a white solid melting above 300° C.

Calc.: P, 5.83; Sn, 22.30. Found: P, 6.13; Sn, 22.37.

EXAMPLE 20

*Nickel-(O-n-butyl-3,5-di-t-butyl-4-hydroxybenzyl phosphonate)-chloride*

Thirty and nine-tenths parts of nickel chloride hexahydrate (0.13 mole) is dissolved in a solvent mixture of 90 parts by volume of methanol and 180 parts by volume of isopropanol. The resulting solution is added dropwise to a solution of 49.3 parts of sodium O-butyl-3,5-di-t-butyl-4-hydroxybenzyl phosphonate (0.13 mole) dissolved in 300 parts by volume of isopropanol at 23 to 27° C. over a period of ten minutes. After the addition is complete, the reaction mixture is stirred at 25° C. for 30 minutes, and at 45 to 50° C. for 1.5 hours. The precipitated sodium chloride is removed by centrifuging the reaction mixture resulting in a quantitative recovery of the sodium chloride. The clear green solution is concentrated at reduced pressures, the solvent being finally removed at 45° C. and a pressure of 0.3 mm. Hg. The brittle glossy yellow product weighs about 62 parts.

Calculated for $C_{19}H_{32}ClO_4PNi$: N, 13.13%; P, 6.98%. Found: N, 12.73%; P, 6.64%.

Nickel - (O-n-octadecyl-3,5-di-t-butyl-4-hydroxybenzyl phosphonate)-chloride is made in a similar manner by reacting equimolar proportions of sodium (O-octadecyl-3,5-di-t-latyl-4-hydroxybenzyl phosphonate) and nickel chloride hexahydrate.

EXAMPLE 21

*Nickel-(3,5 di-t-butyl-4-hydroxybenzyl-phosphonate)-acetate*

Equimolar proportions of nickel-(3,5 di-t-butyl-4-hydroxybenzylphosphonate)-chloride and sodium acetate trihydrate are reacted as in Example 20; nickel-(3,5 di-t-butyl-4-hydroxybenzylphosphonate)-acetate is obtained.

EXAMPLE 22

*Di-nickel-bis-(O-n-butyl-3,5 di-t-butyl-4-hydroxybenzylphosphonate)sulfate*

Equimolar proportions of sodium (O-n-butyl-3,5 di-t-butyl - 4 - hydroxybenzylphosphonate) and nickel sulfate hexahydrate are reacted according to the procedure of Example 20; di-nickel-bis-(3,5 di-t-butyl-4-hydroxybenzylphosphonate)sulfate is obtained.

As is mentioned hereinabove, the stabilizing metal salts and complexes of this invention are characterized by an unexpected combination of valuable properties providing:

(a) Antioxidants which are also effective thermal stabilizers and stabilizers against degradation by light, in particular ultraviolet light, and (b) Dyesites which simultaneously provide stabilization against oxidation, thermal depolymerization, and degradation due to light, particularly ultraviolet light.

Compounds of this invention provide these desirable performance properties in combination to a degree hitherto not achieved in the art. In addition the metal complexes and salts of this invention provide stabilization and dyeing properties which resist removal by laundering and dry cleaning.

These properties are illustrated by the examples which follow.

EXAMPLE 23

Selected metal salts and complexes of this invention are milled into polypropylene at 0.5% by weight concentration (except as otherwise noted). Plaques of 25 mil thickness are molded and exposed to oven aging at 300° F. and the time for embrittlement is noted. Polypropylene compositions with the indicated extended aging times are obtained:

sodium (O-n-butyl-3,5-di-t-butyl-4-hydroxybenzylphosphonate) (275 hours);
cadmium bis (O-n-butyl-3,5-di-t-butyl-4-hydroxybenzylphosphonate) (280 hours);
barium bis (O-n-butyl-3,5-di-t-butyl-4-hydroxybenzylphosphonate) (167 hours);
nickel bis (O-n-butyl-3,5-di-t-butyl-4-hydroxybenzylphosphonate) (204 hours);
aluminum tris (O-n-butyl-3,5-di-t-butyl-4-hydroxybenzylphosphonate) (261 hours);
chromium tris (O-n-butyl-3,5-di-t-butyl-4-hydroxybenzylphosphonate) (265 hours);

tin bis (O-n-butyl-3,5-di-t-butyl-4-hydroxybenzylphosphonate) (129 hours);

dibutyltin bis (O-n-butyl-3,5-di-t-butyl-4-hydroxybenzylphosphonate) (265 hours);

nickel (O-n-octadecyl-3,5-di-t-butyl-4-hydroxybenzylphosphonate) chloride (135 hours; 1% conc.);

nickel (O-n-butyl-3,5-di-t-butyl-4-hydroxybenzylphosphonate) chloride;

nickel bis (O-n-octadecyl-3,5-di-t-butyl-4-hydroxybenzylphosphonate) (116 hours).

Polypropylene, unstabilized, failed in less than 3 hours.

EXAMPLE 24

Selected metal salts and complexes of this invention are milled into polypropylene at a concentration of 0.5% by weight. Plaques of 25 mil thickness are molded and exposed in a Fadeometer to the light emitted by a carbon arc and the time for embrittlement noted. Polypropylene compositions with the indicated extended light exposure times are obtained:

barium bis-(O-n-butyl-3,5-di-t-butyl-4-hydroxybenzylphosphonate) (180 hours);

nickel bis-(O-n-butyl-3,5-di-t-butyl-4-hydroxybenzylphosphonate) (1080 hours);

aluminum tris-(O-n-butyl-3,5-di-t-butyl-4-hydroxybenzylphosphonate) (360 hours);

chromium tris-(O-n-butyl-3,5-di-t-butyl-4-hydroxybenzylphosphonate) (660 hours);

tin bis-(O-n-butyl-3,5-di-t-butyl-4-hydroxybenzylphosphonate) (420 hours);

dibutyltin bis-(O-n-butyl-3,5-di-t-butyl-4-hydroxybenzylphosphonate) (420 hours);

cobalt bis-(O-n-butyl-3,5-di-t-butyl-4-hydroxybenzylphosphonate) (1140 hours);

nickel bis-(O-n-octadecyl-3,5-di-t-butyl-4-hydroxybenzylphosphonate) (800 hours);

barium-3,5-di-t-butyl-4-hydroxybenzylphosphonate (300 hours);

sodium 3,5-di-t-butyl-4-hydroxybenzylphosphonate (120 hours);

cadmium bis-(O-n-butyl-3,5-di-t-butyl-4-hydroxybenzylphosphonate) (120 hours).

In contrast polypropylene alone becomes embrittled after 60 hours.

EXAMPLE 25

Selected metal salts and complexes of this invention are milled into polypropylene at a concentration of 0.5% by weight (except as otherwise noted). Plaques of 25 mil thickness are molded, cut into pieces and 5 grams fed into an extruder at 300° C. The amount in grams extruded in the 10 minute interval between the 6 and 16 minutes extrusion time is termed the Melt Flow Drift, $\Delta MF$. The $\Delta MF$ is a measure of thermal depolymerization, the higher the $\Delta MF$ the greater the thermal depolymerization.

Polypropylene compositions containing the listed metal salts and complexes of this invention resist depolymerization at elevated temperatures:

sodium O-n-butyl-3,5-di-t-butyl-4-hydroxybenzylphosphonate ($\Delta MF=0.45$);

cadmium bis-(O-n-butyl-3,5-di-t-butyl-4-hydroxybenzylphosphonate) ($\Delta MF=0.65$);

barium bis-(O-n-butyl-3,5-di-t-butyl-4-hydroxybenzylphosphonate) ($\Delta MF=0.03$);

nickel bis-(O-n-butyl-3,5-di-t-butyl-4-hydroxybenzylphosphonate) ($\Delta MF=0.45$);

cobalt bis-(O-n-butyl-3,5-di-t-butyl-4-hydroxybenzylphosphonate) ($\Delta MF=0.95$);

nickel (O-n-octadecyl-3,5-di-t-butyl-4-hydroxybenzylphosphonate) ($\Delta MF=1.20$; conc. 1%);

nickel (O-n-butyl-3,5-di-t-butyl-4-hydroxybenzylphosphonate) ($\Delta MF=0.35$; conc. 1%);

nickel bis-(O-n-octadecyl-3,5-di-t-butyl-4-hydroxybenzylphosphonate) ($\Delta MF=1.45$);

barium (3,5-di-t-butyl-4-hydroxybenzylphosphonate) ($\Delta MF=0.70$)

In contrast the $\Delta MF$ of polypropylene is too great to measure, indicating extensive thermal depolymerization.

EXAMPLE 26

Selected metal salts and complexes of this invention are melted into polypropylene at a concentration of 0.5% in 5 mil films. These films are then dyed with an orange dye having the following structure.

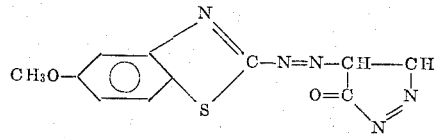

Dyeing was exhibited by polypropylene containing the following metal salts and complexes:

cadmium bis-(O-n-butyl-3,5-di-t-butyl-4-hydroxybenzylphosphonate)

barium bis-(O-n-butyl-3,5-di-t-butyl-4-hydroxybenzylphosphonate)

barium (3,5-di-t-butyl-4-hydroxybenzylphosphonate)

nickel bis-(O-n-butyl-3,5-di-t-butyl-4-hydroxybenzylphosphonate)

nickel (O-n-butyl-3,5-di-t-butyl-4-hydroxybenzylphosphonate)-chloride nickel bis-(O-n-octadecyl-3,5-di-t-butyl-4-hydroxybenzylphosphonate)

nickel (O-n-octadecyl-3,5-di-t-butyl-4-hydroxybenzylphosphonate)-chloride cobalt-bis-(O-n-butyl-3,5-di-t-butyl-4-hydroxybenzylphosphonate)

In contrast, polypropylene alone did not dye.

EXAMPLE 27

Nickel bis - (O - n - octadecyl-3,5-di-t-butyl-4-hydroxybenzylphosphonate) is incorporated into polypropylene powder at a concentration of 1.0 percent by weight and extruded into pellets at 450° F. The pellets are then spun into 100 denier multifilament yarn and hot drawn four times after spinning. The resulting yarn is then knitted into continuous tubular socks and tested for wash fastness.

The wash fastness test is that recommended by the American Association of Textile Chemists and Colorists (Test method 61–1961 T, condition IV A) involving laundering with detergent followed by drying at 250° F., each laundering and drying being termed one cycle. The polypropylene knitted sock containing 1% by weight of nickel bis (O - n - octadecyl-3,5-di-t-butyl-4-hydroxybenzylphosphonate) endured 46 cycles.

EXAMPLE 28

A composition of linear polyethylene is prepared by mixing therein 0.1% by weight of nickel bis (O-n-octadecyl-3,5-di-t-butyl-4-hydroxybenzyl phosphonate). This composition is injection molded into tensile bars which are placed in a circulating air oven at 120° C. In contrast with a loss of all tensile strength in 2 weeks in control bars containing polyethylene and 0.1% of butylated hydroxytoluene, a commercial antioxidant, the instant composition retains its tensile strength for a substantially longer period.

EXAMPLE 29

A composition is prepared comprising nylon 6 polyamide and 0.5% by weight of nickel bis (O-n-butyl-3,5-di-t-butyl-4-hydroxybenzylphosphonate). In contrast to those molded from unstabilized nylon 6, tensile bars molded from the instant composition retain their strength to substantially longer periods at 100° C., and yellowing is retarded as measured by Fadeometer exposure.

EXAMPLE 30

A polyvinyl chloride composition comprising 100 parts of vinyl chloride resin (Goodyear Geon 103 EP), 2 parts of dibutyltin maleate and 0.5 part of stearic acid is molded into plaques and exposed to 180° C., in an air circulating oven. This composition becomes yellow at 160 minutes and black at 200 minutes. In contrast when there is added to a composition as above 1.0% by weight of nickel bis (O-n-octadecyl-3,5-di-t-butyl-4-hydroxybenzylphosphonate) the plaques remain clear for a much longer time.

EXAMPLE 31

A composition comprising an acrylonitrile-butadiene-styrene terpolymer and 1.0% by weight of nickel bis (O-n-octadecyl-3,5-di-t-butyl-4-hydroxybenzylphosphonate) resists discoloration at 120° C. longer than one which does not contain the stabilizer.

A composition comprising polyurethane and 1.0% by weight of nickel bis (O-n-butyl-3,5-di-t-butyl-4-hydroxybenzylphosphonate) is more stable under fluorescent sunlamps, black lights and fluorescent lights than the unformulated polyurethane.

EXAMPLE 32

A stabilized gasoline is prepared by incorporating into Texas cracked gasoline having no additives therein, 0.1% by weight of dibutyltin bis(O-n-butyl-3,5-di-t-butyl-4-hydroxybenzylphosphonate).

Stabilized lard is prepared by incorporating in lard 0.1% by weight of nickel bis(O-n-octadecyl-3,5-di-t-butyl-4-hydroxybenzylphosphonate).

A stabilized high temperature aliphatic ester lubricating oil is prepared by incorporating 1% by weight of aluminum tris(O-n-butyl-3,5-di-t-butyl-4-hydroxybenzylphosphonate) into diisoamyladipate.

Heptaldehyde is stabilized by incorporating into the freshly distilled aldehyde 0.1% by weight of dibutyltin bis (O-n-octadecyl-3,5-di-t-butyl-4-hydroxybenzylphosphonate).

Paraffin wax is stabilized by incorporating therein 0.1% by weight of dibutyltin bis(O-n-butyl-3,5-di-t-butyl-4-hydroxybenzylphosphonate).

What is claimed is:

1. A compound of the formula:

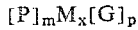

wherein

M comprises a metal having an available valence of from 1 to 4;

G is an anion having an available valence of from 1 to 3; and

P is of the formula:

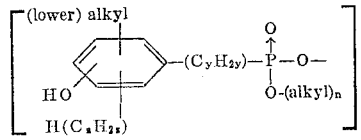

and wherein $z$ has a value of from 0 to 6,
$y$ has a value of from 1 to 4,
$n$ has a value of from 0 to 1,
$m$ has a value of from 1 to 3,
$x$ has a value of from 1 to 2, and
$p$ has a value of from 0 to 3, $n$, $m$, $p$ and $x$ being so selected as to satisfy the expression $$\frac{(2-n)m}{x} + \frac{(r)p}{x} = \text{available valence of } M$$

wherein $r$ is the valence of anion G and has a value of from 1 to 3.

2. Compounds of the formula:

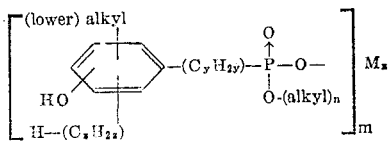

wherein

M comprises a metal having an available valence of from 1 to 4,
$z$ has a value of from 0 to 6,
$y$ has a value of from 1 to 4,
$n$ has a value of from 0 to 1,
$m$ has a value of from 1 to 3, and
$x$ has a value of from 1 to 2, $n$, $m$ and $x$ being so selected as to satisfy the expression $$\frac{(2-n)m}{x} = \text{available valence of } M$$

3. Compounds of the formula:

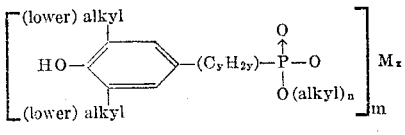

wherein

M is a metal having an available valence of from 2 to 3,
$y$ has a value of from 1 to 4,
$n$ has a value of from 0 to 1,
$m$ has a value of from 1 to 3, and
$x$ has a value of from 1 to 2

$n$, $m$ and $x$ being so selected as to satisfy the expression $$\frac{(2-n)m}{x} = \text{available valence of } M$$

4. Compounds of the formula:

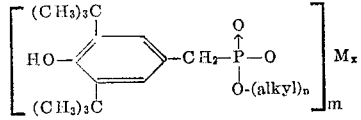

wherein

M is a metal having an available valence of from 2 to 3 and is selected from cadmium, zinc, barium, nickel, aluminum, tin, chromium or cobalt,
$n$ has a value of from 0 to 1,
$m$ has a value of from 1 to 3, and
$x$ has a value of from 1 to 2, $n$, $m$ and $x$ being so selected as to satisfy the expression $$\frac{(2-n)m}{x} = \text{available valence of } M$$

5. A compound as defined in claim 4 wherein M is nickel, $n$ is 1, $m$ is 2 and $x$ is 1.

6. A compound as defined in claim 4 wherein M is chromium, $n$ is 1, $m$ is 3, and $x$ is 1.

7. A compound as defined in claim 4 wherein M is aluminum, $n$ is 1, $m$ is 3, and $x$ is 1.

8. A compound as defined in claim 4 wherein M is cadmium, $n$ is 1, $m$ is 2, and $x$ is 1.

9. A compound as defined in claim 4 wherein M is sodium, $n$ is 1, alkyl is butyl, $m$ is 1, and $x$ is 1.

10. A compound as defined in claim 4 wherein M is zinc, $n$ is 1, alkyl is butyl, $m$ is 2, and $x$ is 1.

11. A compound as defined in claim 4 wherein M is cadmium, $n$ is 1, alkyl is butyl, $m$ is 2 and $x$ is 1.

12. A compound as defined in claim 4 wherein M is barium, $n$ is 1, alkyl is butyl, $m$ is 2, and $x$ is 1.

13. A compound as defined in claim 4 wherein M is nickel, $n$ is 1, alkyl is butyl, $m$ is 2, and $x$ is 1.

14. A compound as defined in claim 4 wherein M is chromium, $n$ is 1, alkyl is butyl, $m$ is 3, and $x$ is 1.

15. A compound as defined in claim 4 wherein M is aluminum, $n$ is 1, alkyl is butyl, $m$ is 3, and $x$ is 1.

16. A compound as defined in claim 4 wherein M is tin, $n$ is 1, alkyl is butyl, $m$ is 2, and $x$ is 1.

17. A compound as defined in claim 4 wherein M is cobalt, $n$ is 1, alkyl is butyl, $m$ is 2, and $x$ is 1.

18. A compound as defined in claim 4 wherein M is zinc, $n$ is 0, $m$ is 1, and $x$ is 1.

19. A compound as defined in claim 4 wherein M is cadmium, $n$ is 0, $m$ is 1, and $x$ is 1.

20. A compound as defined in claim 4 wherein M is barium, $n$ is 0, $m$ is 1, and $x$ is 1.

21. A compound as defined in claim 4 wherein M is aluminum, $n$ is 0, $m$ is 3, and $x$ is 2.

22. A compound as defined in claim 4 wherein M is dibutyltin, $n$ is 1, alkyl is butyl, $m$ is 2, and $x$ is 1.

23. A compound as defined in claim 4 wherein M is dibutyltin, $n$ is 0, $m$ is 1, and $x$ is 1.

24. A compound as defined in claim 4 wherein M is nickel, $n$ is 1, alkyl is octadecyl, $m$ is 2, and $x$ is 1.

25. A compound as defined in claim 1 wherein M is nickel, $n$ is 1, alkyl is butyl, $z$ is 4, $y$ is 1, $m$ is 1, $x$ is 1, $p$ is 1, G is chloride and the benzene ring in P is disubstituted with t-butyl in the 3- and 5-positions, the hydroxyl group being fixed in the 4-position.

26. A compound as defined in claim 1 wherein M is nickel, $n$ is 1, alkyl is octadecyl, $z$ is 4, $y$ is 1, $m$ is 1, $x$ is 1, $p$ is 1, G is chloride and the benzene ring is disubstituted with t-butyl in the 3- and 5-positions, the hydroxyl group being fixed in the 4-position.

No references cited.

TOBIAS E. LEVOW, *Primary Examiner.*

HELEN M. McCARTHY, *Examiner.*

A. P. DEMERS, *Assistant Examiner.*